(12) United States Patent
Horii

(10) Patent No.: US 12,537,453 B2
(45) Date of Patent: Jan. 27, 2026

(54) SWITCHING POWER SUPPLY DEVICE, SWITCHING CONTROL DEVICE, AND INDUSTRIAL EQUIPMENT

(71) Applicant: Rohm Co., Ltd., Kyoto (JP)

(72) Inventor: Kazuhiro Horii, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 225 days.

(21) Appl. No.: 18/397,815

(22) Filed: Dec. 27, 2023

(65) Prior Publication Data

US 2024/0128878 A1    Apr. 18, 2024

Related U.S. Application Data

(63) Continuation of application No. PCT/JP2022/023919, filed on Jun. 15, 2022.

(30) Foreign Application Priority Data

Jul. 1, 2021    (JP) .................................. 2021-110280

(51) Int. Cl.
*H02M 3/335*    (2006.01)
*H02M 1/40*    (2007.01)

(52) U.S. Cl.
CPC ......... *H02M 3/33546* (2013.01); *H02M 1/40* (2013.01); *H02M 3/33515* (2013.01)

(58) Field of Classification Search
CPC .... H02M 1/40; H02M 3/335; H02M 3/33515; H02M 3/33546
See application file for complete search history.

(56) References Cited

U.S. PATENT DOCUMENTS

| | | | | |
|---|---|---|---|---|
| 2010/0283442 A1* | 11/2010 | Nakashima | ......... | H02M 3/1588 |
| | | | | 323/283 |
| 2013/0335047 A1* | 12/2013 | Yamaguchi | ........... | H02M 3/156 |
| | | | | 323/282 |
| 2017/0070149 A1* | 3/2017 | Guan | ...................... | H02M 1/36 |
| 2022/0200451 A1* | 6/2022 | Mai | ........................ | H02M 3/158 |

FOREIGN PATENT DOCUMENTS

JP    2014-138458    7/2014

OTHER PUBLICATIONS

International Search Report and Written Opinion in International Appln. No. PCT/JP2022/023919, mailed on Aug. 2, 2022, 13 pages (with machine translation).

* cited by examiner

*Primary Examiner* — Gary L Laxton
(74) *Attorney, Agent, or Firm* — Fish & Richardson P.C.

(57) ABSTRACT

A switching power supply device includes a switching element and a controller. The controller includes a current source circuit, a voltage source circuit, a PWM signal generation circuit, a capacitor of which the first terminal is connected to the current source circuit and of which the second terminal is connected to the PWM signal generation circuit, a one-way conduction element provided between the first terminal of the capacitor and the voltage source circuit and configured to pass only a current flowing from the capacitor toward the voltage source circuit, and a comparison circuit configured to compare the voltage appearing at the first terminal of the capacitor with a voltage based on the output voltage of the switching power supply device and to control the switching device based on the result of the comparison.

10 Claims, 7 Drawing Sheets

SWITCHING POWER SUPPLY DEVICE, SWITCHING CONTROL DEVICE, AND INDUSTRIAL EQUIPMENT

CROSS-REFERENCE TO RELATED APPLICATIONS

This nonprovisional application is a continuation application of International Patent Application No. PCT/JP2022/023919 filed on Jun. 15, 2022, which claims priority Japanese Patent Application No. 2021-110280 filed in Japan on Jul. 1, 2021, the entire contents of which are hereby incorporated by reference.

BACKGROUND OF THE INVENTION

1. Technical Field

The invention disclosed herein relates to a switching power supply device, a switching control device, and industrial equipment.

2. Description of Related Art

Some known switching power supply devices perform maximum on duty control (see, for example, Japanese Unexamined Patent Application Publication No. 2014-138458 (paragraph 0153)).

Particularly in switching power supply devices that use transformers, maximum on duty control is a very important technology to prevent transformer saturation.

DETAILED DESCRIPTION

In this specification, a MOS field-effect transistor denotes a field-effect transistor of which the gate has a structure composed of at least three layers, specifically a layer of a conductor or a semiconductor with a low resistance value such as polysilicon, a layer of an insulator, and a layer of a P-type, N-type, or intrinsic semiconductor. Thus, the gate structure of the MOS field-effect transistor is not limited to a three-layer structure of metal, oxide, and semiconductor.

In this specification, a predetermined current denotes a current that is constant under ideal conditions, and this can be a current that varies slightly with variation in temperature or the like.

In this specification, a predetermined voltage denotes a voltage that is constant under ideal conditions, and this can be a voltage that varies slightly with variation in temperature or the like.

In this specification, a reference voltage denotes a voltage that is constant under ideal conditions, and this can be a voltage that varies slightly with variation in temperature or the like.

<First Embodiment>

Figure 1:
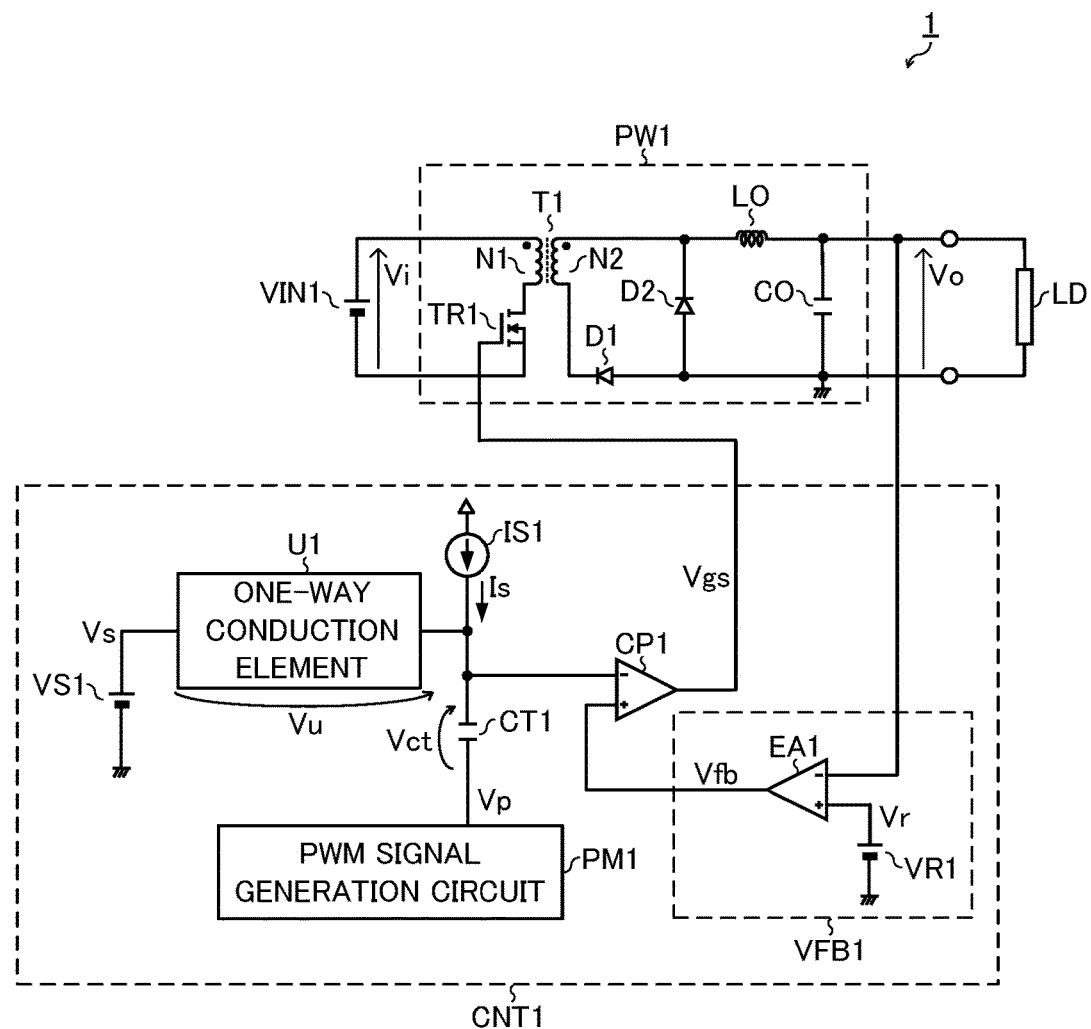
FIG. 1 is a diagram showing a schematic configuration of a switching power supply device according to a first embodiment.

FIG. 1 is a diagram showing the schematic configuration of a switching power supply device according to a first embodiment. The switching power supply device 1 according to the first embodiment (hereinafter referred to as "the switching power supply device 1") is a power supply device that converts an input voltage Vi generated by an input power supply VIN1 into an output voltage Vo to output the output voltage Vo. The switching power supply device 1 includes a power circuit PW1 and a controller CNT1.

The power circuit PW1 includes a transformer T1, a switching element TR1, a rectification element D1, a freewheel element D2, an output choke coil LO, and an output capacitor CO. The transformer T1 has a primary winding N1 and a secondary winding N2. In this embodiment, an N-channel MOS field-effect transistor is employed as the switching element TR1, but the switching element TR1 is not limited to an N-channel type MOS field-effect transistor. The switching element TR1 may be, for example, a bipolar transistor. In this embodiment, diodes are employed as the rectification and freewheel elements D1 and D2, but the rectification and freewheel elements D1 and D2 are each not limited to diodes. The rectification and freewheel elements D1 and D2 may each be, for example, a synchronous rectification element.

The first terminal of the primary winding N1 is connected to the positive pole of the input power supply VIN1. The second terminal of the primary winding N1 is connected to the drain of the switching element TR1. The source of the switching element TR1 is connected to the negative pole of the input power supply VIN1.

The first terminal of the secondary winding N2 is connected to the cathode of the freewheel element D2 and to the first terminal of the output choke coil LO. The second terminal of the output choke coil LO is connected to the first terminal of the output capacitor CO. The second terminal of the secondary winding N2 is connected to the cathode of the rectification element D1. The anode of the rectification element D1 is connected to the anode of the freewheel element D2, to the second terminal of the output capacitor CO, and to a ground potential. The output voltage Vo appears across the output capacitor CO.

In this embodiment, the power circuit PW1 is a single-ended forward converter. In the power circuit PW1, which is a single-ended forward converter, when the switching element TR1 turns on, a current is fed to a load LD via the rectification element D1 and the output choke coil LO, and when the switching element TR1 turns off, the energy stored in the output choke coil LO is discharged and a current is fed to the load LD via the freewheel element D2.

Note that a single-ended forward converter is merely an example, so the power circuit PW1 may be of a type other than a single-ended forward converter. The power circuit PW1 may be configured without a transformer.

The controller CNT1 includes a current source circuit IS1, a voltage source circuit VS1, a one-way conduction element U1, a PWM (pulse-width modulation) signal generation circuit PM1, an output voltage control signal generation circuit VFB1, a timing capacitor CT1, and a comparison circuit CP1. The controller CNT1 is configured to control the switching element TR1. In other words, the controller CNT1 is a switching control device configured to turn the switching element TR1 on and off. The output voltage control signal generation circuit VFB1 has an error amplifier EA1 and a reference voltage source circuit VR1. The output voltage control signal generation circuit VFB1 may have a circuit configuration other than the configuration shown in FIG. 1, for example a circuit configuration including a photocoupler.

The inverting input terminal of the error amplifier EA1 is fed with the output voltage Vo. The non-inverting input terminal of the error amplifier EA1 is connected with the positive pole of the reference voltage source circuit VR1. The negative pole of the reference voltage source circuit VR1 is connected to the ground potential.

The output terminal of the error amplifier EA1 is connected to the non-inverting input terminal of the comparison circuit CP1.

The first terminal of the current source circuit IS1 is fed with a voltage for driving the current source circuit IS1. The second terminal of the current source circuit IS1 is connected to the first terminal of the one-way conduction element U1, to the first terminal of the timing capacitor CT1, and to the inverting input terminal of the comparison circuit CP1.

The second terminal of the one-way conduction element U1 is connected to the positive terminal of the voltage source circuit VS1. The negative terminal of the voltage source circuit VS1 is connected to the ground potential.

The second terminal of the timing capacitor CT1 is connected to the PWM signal generation circuit PM1.

The current source circuit IS1 is configured to output a predetermined current Is.

The voltage source circuit VS1 is configured to output a predetermined voltage Vs. A predetermined voltage Vs such that the sum value resulting from adding up a predetermined voltage Vs and the forward voltage Vu across the one-way conduction element U1 is higher than the maximum value Vfb_max of an output voltage control signal Vfb, which will be described later, is output from the voltage source circuit VS1.

The PWM signal generation circuit PM1 is configured to output a PWM signal Vp. The PWM signal generation circuit PM1 feeds the PWM signal Vp to the second terminal of the timing capacitor CT1.

The timing capacitor CT1 generates a charge voltage Vct with a sloped waveform by being charged with (by integrating) the predetermined current Is. Thus, a sum voltage Vadd resulting from adding up the PWM signal Vp and the charge voltage Vct appears at the first terminal of the timing capacitor CT1.

The one-way conduction element U1 is configured to pass only a current that flows from the timing capacitor CT1 toward the voltage source circuit VS1. Thus, when the sum voltage Vadd is higher than the predetermined voltage Vs, a current pass through the one-way conduction element U1 and the timing capacitor CT1 discharges.

The output voltage control signal generation circuit VFB1 is configured to generate an output voltage control signal Vfb which is a voltage based on the output voltage Vo. The error amplifier EA1 is configured to output, as the output voltage control signal Vfb, an error signal between the output voltage Vo and the reference voltage Vr output from the reference voltage source circuit VR1.

The comparison circuit CP1 is configured to compare the sum voltage Vadd with the output voltage control signal Vfb to control the switching element TR1 based on the comparison result. Specifically, if the sum voltage Vadd is higher than the output voltage control signal Vfb, the output signal Vgs of the comparison circuit CP1 is at low level and the switching element TR1 is off. By contrast, if the sum voltage Vadd is lower than the output voltage control signal Vfb, the output signal Vgs of the comparison circuit CP1 is at high level and the switching element TR1 is on.

Figure 2:
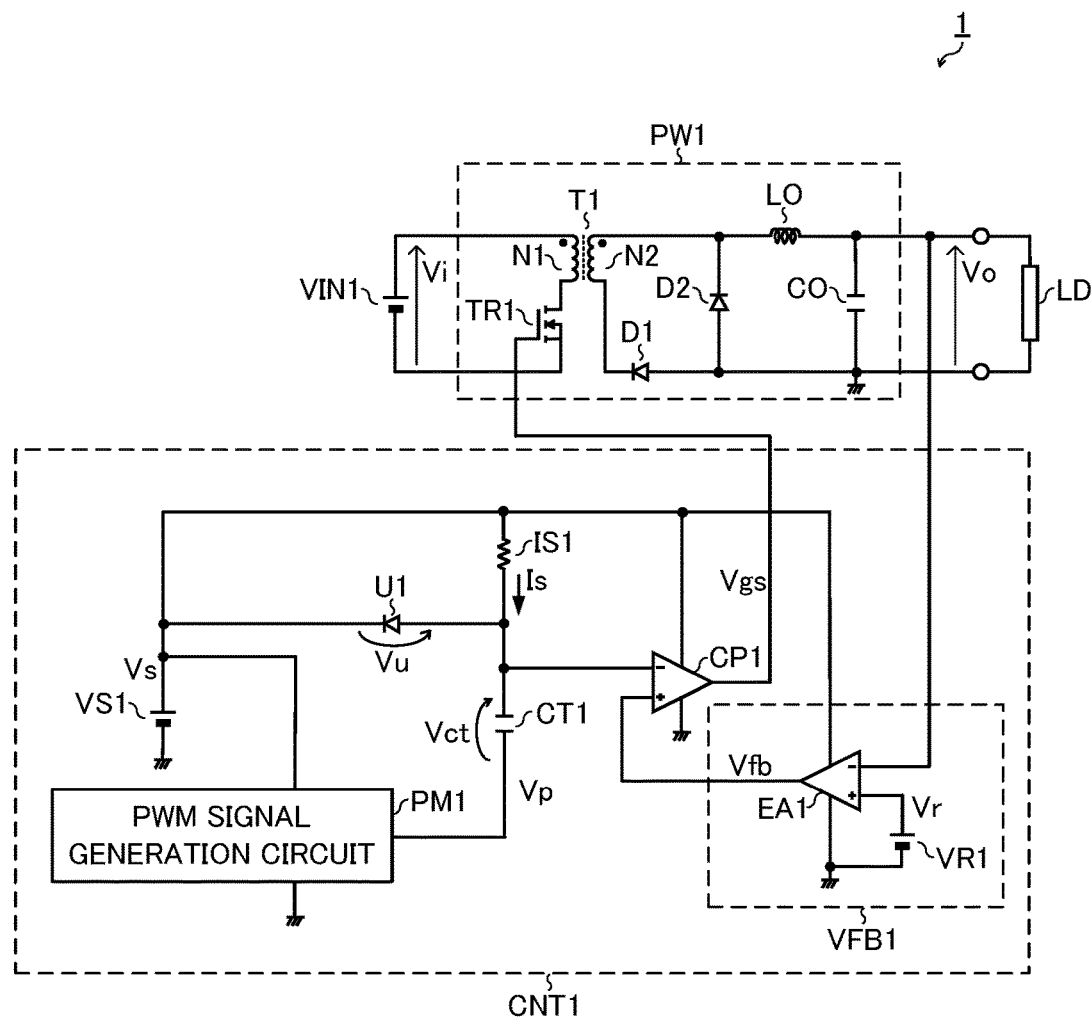
FIG. 2 is a diagram showing a first configuration example of the switching power supply device according to the first embodiment.

FIG. 2 is a diagram showing a first configuration example of the switching power supply device 1. In the first configuration example shown in FIG. 2, the one-way conduction element U1 is a diode with its anode connected to the first terminal of the timing capacitor CT1 and its cathode connected to the voltage source circuit VS1. According to the first configuration example shown in FIG. 2, the one-way conduction element U1 can be implemented without any special control.

In the first configuration example shown in FIG. 2, the current source circuit IS1 is a resistive element. Using a resistive element as the current source circuit IS1 gives the current source circuit IS1 a simple configuration.

In the first configuration example shown in FIG. 2, the supply voltage for the controller CNT1 is the predetermined voltage Vs. Specifically, the predetermined voltage Vs is fed to the PWM signal generation circuit PM1, to the first terminal of the current source circuit IS1, to the supply terminal of the comparison circuit CP1, and to the supply terminal of the error amplifier EA1. In this way, it is easy to make the sum value resulting from adding up the predetermined voltage Vs and the forward voltage Vu across the one-way conduction element U1 higher than the maximum value Vfb_max of the output voltage control signal Vfb.

Figure 3:
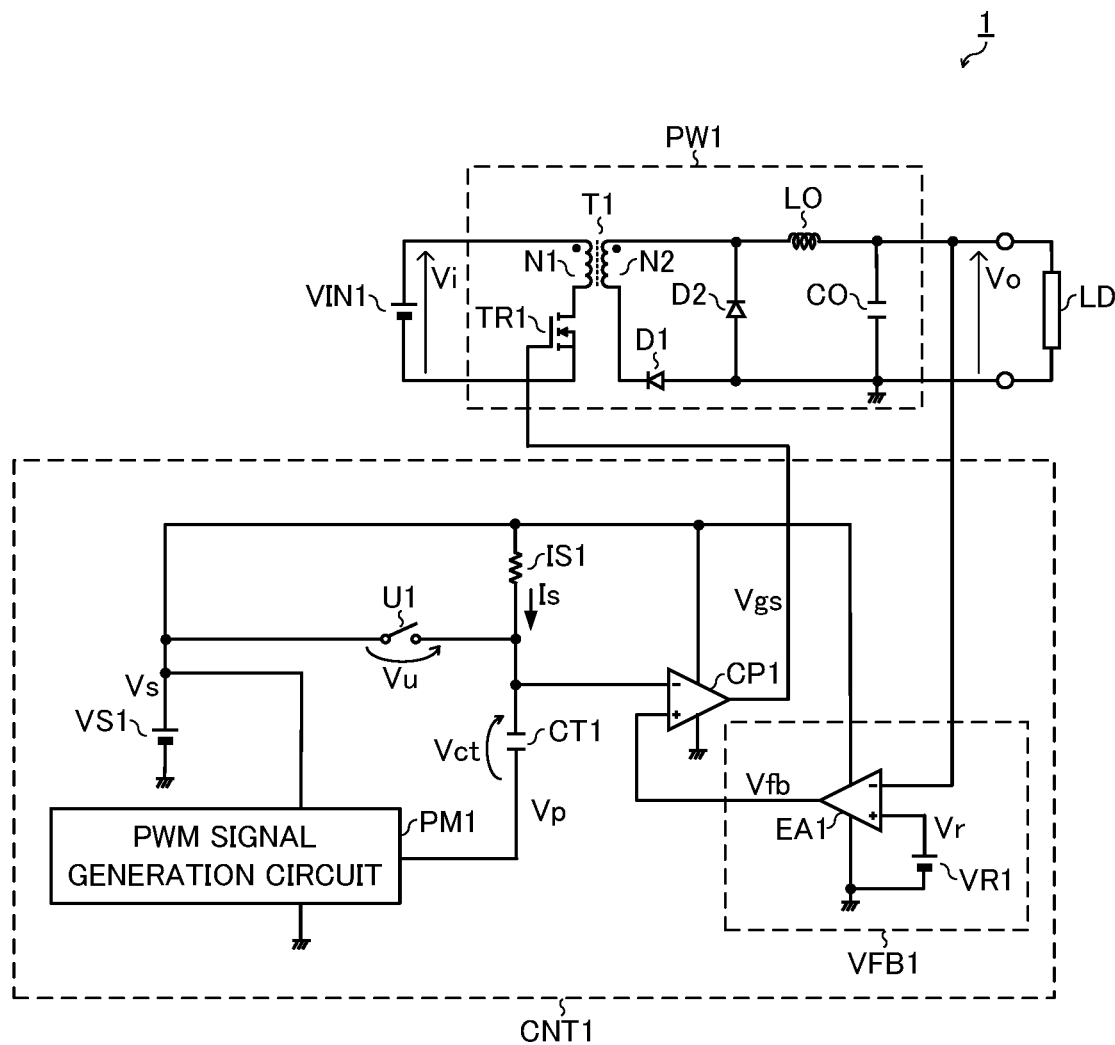
FIG. 3 is a diagram showing a second configuration example of the switching power supply device according to the first embodiment.

FIG. 3 is a diagram showing a second configuration example of the switching power supply device 1. In the second configuration example shown in FIG. 3, the one-way conduction element U1 is a synchronous rectification element that turns on and off according to the PWM signal Vp. As the synchronous rectification element, a MOS field-effect transistor or the like with a lower forward voltage than a diode can be used. Thus, according to the second configuration example shown in FIG. 3, it is possible to reduce the on resistance of the one-way conduction element U1 and thus to enhance efficiency.

In the second configuration example shown in FIG. 3, the current source circuit IS1 is a resistive element. Using a resistive element as the current source circuit IS1 gives the current source circuit IS1 a simple configuration.

In the second configuration example shown in FIG. 3, the supply voltage for the controller CNT1 is the predetermined voltage Vs. Specifically, the predetermined voltage Vs is fed to the PWM signal generation circuit PM1, to the first terminal of the current source circuit IS1, to the supply terminal of the comparison circuit CP1, and to the supply terminal of the error amplifier EA1. In this way, it is easy to make the sum value resulting from adding up the predetermined voltage Vs and the forward voltage Vu across the one-way conduction element U1 higher than the maximum value Vfb_max of the output voltage control signal Vfb.

Figure 4:
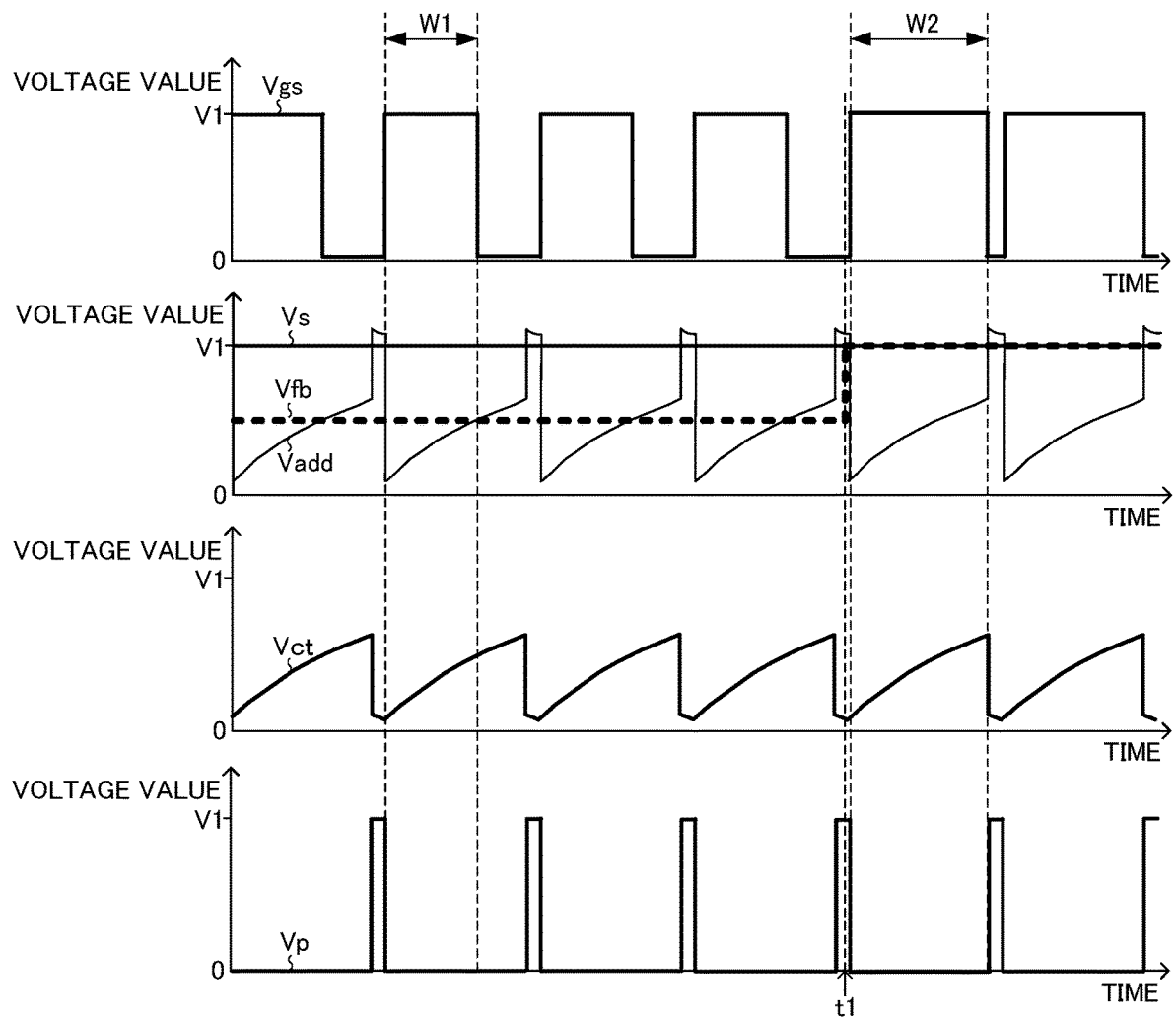
FIG. 4 is a diagram showing the waveforms of the voltages at relevant points in the switching power supply device shown in FIG. 2.

FIG. 4 is a diagram showing the waveforms of the voltages at relevant points in the switching power supply device 1. FIG. 4 shows the waveforms of the output signal Vgs of the comparison circuit CP1, the predetermined voltage Vs, the output voltage control signal Vfb, the sum voltage Vadd, the charge voltage Vct, and the PWM signal Vp. In FIG. 4, the horizontal axis indicates time and the vertical axis indicates voltage value. "V1" in FIG. 4 represents the value of the predetermined voltage Vs.

FIG. 4 is a diagram showing the waveforms of the voltages at relevant points as observed when a sharp rise in the current flowing through the load LD at timing t1 has caused a temporary drop in the output voltage Vo.

In a period before timing t1 in FIG. 4, the pulse width W1 of the output signal Vgs of the comparison circuit CP1 is determined by the output voltage control signal Vfb and the sum voltage Vadd. By contrast, in a period after timing t1 in FIG. 4, the pulse width W2 of the output signal Vgs of the comparison circuit CP1 is determined by the low-level period of the PWM signal Vp. That is, the maximum on duty of the switching element is equal to the off duty of the PWM signal Vp and is limited by the off duty of the PWM signal Vp.

With the switching power supply device 1, both when the switching element Tr1 is driven with the maximum on duty (the period after timing t1 in FIG. 4) and when the switching element Tr1 is not driven with the maximum on duty (the period before timing t1 in FIG. 4), the switching element Tr1 can be controlled directly with the output signal Vgs of the comparison circuit CP1. It is thus possible to reduce the number of components of the switching power supply device 1 and to implement maximum on duty control at low cost.

The on duty duty of the PWM signal Vp is set to be equal to or more than a first duty duty1 so that the output voltage Vo can meet a target output voltage Vt and is set to be less than a second duty duty2 to prevent saturation of the transformer T1. The first and second duties duty1 and duty2 can each be calculated according to the formulae below. There, n1 is the number of turns of the primary winding N1, n2 is the number of turns of the secondary winding N2, Vt is the input voltage, Vt is the target output voltage, Bm is the maximum magnetic flux density in the core of the transformer T1, Ae is the effective cross-sectional area of the core of the transformer T1, and T is the switching period of the switching element Tr1.

$$duty1 \leq duty < duty2$$

$$duty1 = (n2/n1) \cdot Vt/Vi$$

$$duty2 = (Bm \cdot n1 \cdot Ae)/(Vi \cdot T)$$

<Second Embodiment>

Figure 5:
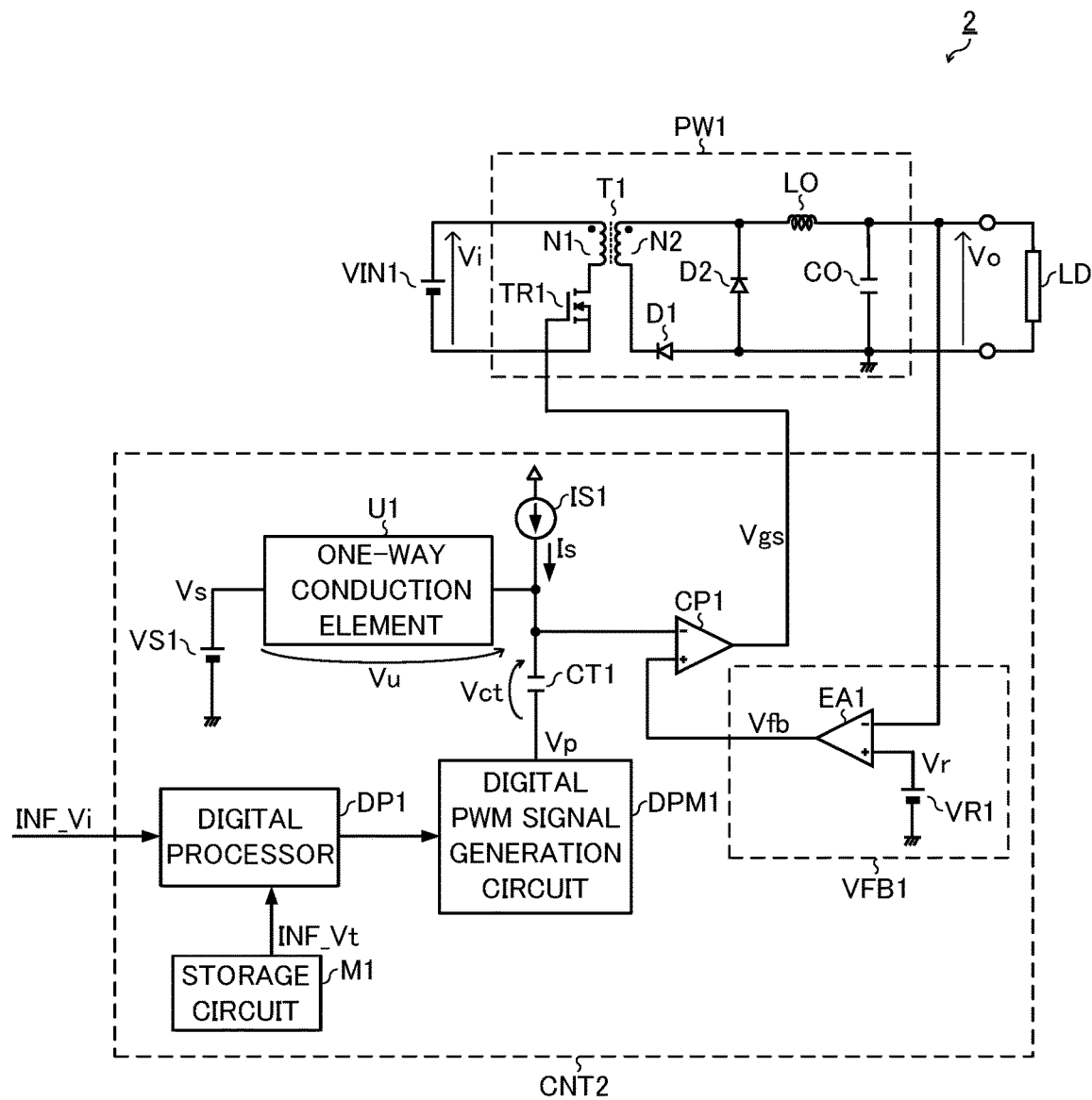
FIG. 5 is a diagram showing a schematic configuration of a switching power supply device according to a second embodiment.

FIG. 5 is a diagram showing the schematic configuration of a switching power supply device 2 according to a second embodiment. The switching power supply device 2 according to the second embodiment (hereinafter referred to as "switching power supply device 2") is a power supply device that converts an input voltage Vi generated by an input power supply VIN1 into an output voltage Vo to output the output voltage Vo. The switching power supply device 2 includes a power circuit PW1 and a controller CNT2.

The controller CNT2 includes a digital processor DP1 and a storage circuit M1. The controller CNT2 differs from the controller CNT1 in the first embodiment in that it includes a digital PWM signal generation circuit DPM1 as a PWM signal generation circuit that performs digital processing instead of the PWM signal generation circuit PM1 that performs analog processing, and is otherwise the same as the controller CNT1 in the first embodiment. The controller CNT2, like the controller CNT1, is configured to control the switching element TR1. In other words, the controller CNT2, like the controller CNT1, is a switching control device configured to turn the switching element TR1 on and off.

Accordingly, the switching power supply device 2 accommodates the specific examples, modified examples, and the like described in connection with the first embodiment.

The storage circuit M1 is configured to store information INF_Vt on the target output voltage Vt in advance. As the storage circuit M1, for example, a register, a nonvolatility memory, or the like can be used.

The digital processor DP1 is configured to set the pulse width of the PWM signal Vp based on information INF_Vi on the input voltage Vi and information INF_Vt on the target output voltage Vt stored in the storage circuit M1. As the digital processor DP1, for example, a CPU (central processing unit), a DSP (digital signal processor), or the like can be used. Information INF_Vi on the input voltage Vi is fed to the digital processor DP1 from an input voltage sensor (not illustrated) configured to sense the input voltage Vi and generate, in the form of digital data, information INF_Vi on the input voltage Vi based on the result of the sensing.

In the switching power supply device 2, the PWM signal Vp is more accurate than in the switching power supply device 1, so the maximum on duty control too is more accurate. Thus, in the switching power supply device 2, it is possible to reduce the margin for the size of the core of the transformer T1 and hence to reduce the size of the transformer T1.

Figure 6:
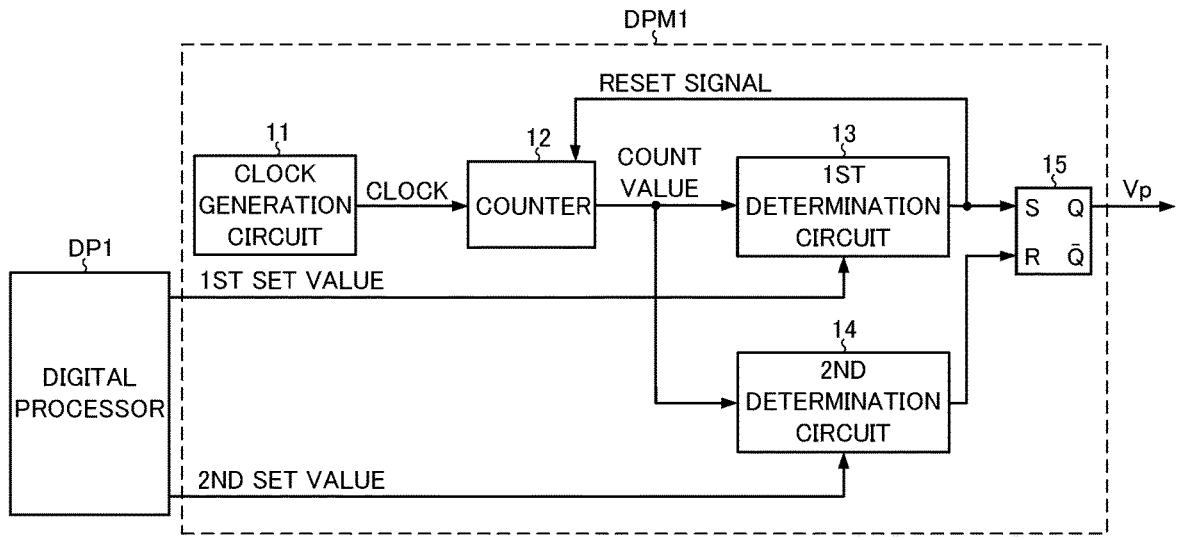
FIG. 6 is a diagram showing one configuration example of a digital PWM signal generation circuit.

FIG. 6 is a diagram showing one configuration example of the digital PWM signal generation circuit DPM1. The digital PWM signal generation circuit DPM1 shown in FIG. 6 includes a clock generation circuit 11, a counter 12, a first determination circuit 13, a second determination circuit 14, and an output circuit 15.

The clock generation circuit 11 is configured to output a clock.

The counter 12 is configured to update its count value based on the clock generated by the clock generation circuit 11. Specifically, the count value is incremented by one every cycle of the clock.

The first determination circuit 13 is configured to check the relationship between the count value of the counter 12 and a first set value for setting the period of the PWM signal Vp fed from the digital processor DP1. Specifically, the first determination circuit 13 checks whether the count value of the counter 12 has reached the first set value. When the count value of the counter 12 reaches the first set value, the first determination circuit 13 outputs a high-level signal. When the count value of the counter 12 has not reached the first set value, the first determination circuit 13 outputs a low-level signal.

The second determination circuit 14 is configured to check the relationship between the count value of the counter 12 and a second set value for setting the pulse width of the PWM signal Vp fed from the digital processor DP1. Specifically, the second determination circuit 14 checks whether the count value of the counter 12 has reached the second set value. When the count value of the counter 12 reaches the second set value, the second determination circuit 14 outputs a high-level signal. When the count value of the counter 12 has not reached the second set value, the second determination circuit 14 outputs a low-level signal.

The output circuit 15 is configured to generate the PWM signal Vp based on the output signal of the first determination circuit 13, which represents the result of the check by the first determination circuit 13, and the output signal of the second determination circuit 14, which represents the result of the check by the second determination circuit 14. In the configuration example shown in FIG. 6, an RS flip-flop is employed as the output circuit 15. The set terminal (S terminal) of the RS flip-flop is fed with the output signal of the first determination circuit 13 and the reset terminal (R terminal) of the RS flip-flop is fed with the output signal of the second determination circuit 14. The output terminal (Q terminal) of the RS flip-flop outputs the PWM signal Vp.

The output signal of the first determination circuit 13 is used also as the reset signal for resetting the counter 12. When the output signal of the first determination circuit 13 turns to high level, the counter 12 resets the count value.

With the configuration example shown in FIG. 6, the period and the pulse width of the PWM signal Vp can each be freely set without the need for a plurality of counters. No need for a plurality of counters helps reduce the cost and the size of the digital PWM signal generation circuit DPM1.

Figure 7:
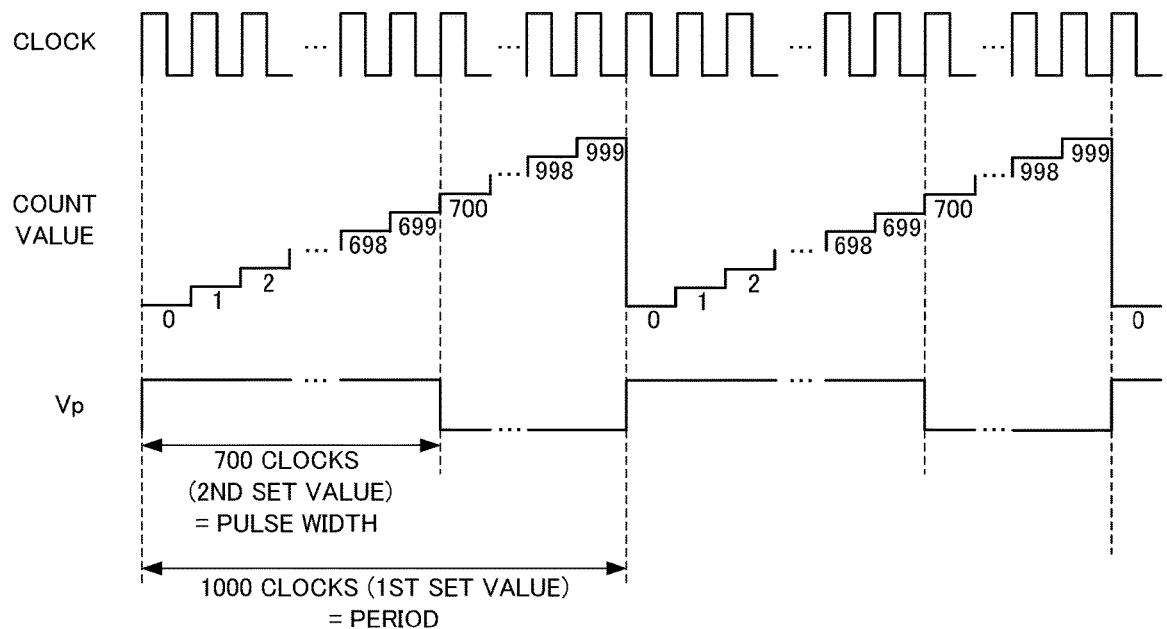
FIG. 7 is a diagram illustrating the operation of the digital PWM signal generation circuit shown in FIG. 6.

FIG. 7 is a diagram illustrating the operation of the digital PWM signal generation circuit DPM1 shown in FIG. 6. In FIG. 7, the period of the PWM signal Vp is set to 1000 clocks and the pulse width of the PWM signal Vp is set to 700 clocks. Accordingly, in the example shown in FIG. 7, the maximum on duty of the switching element TR1 is 70%.

As described in connection with the first embodiment, the on duty of the PWM signal Vp is set to be equal to or more than the first duty duty1 so that the output voltage Vo can meet the target output voltage Vt and is set to be less than the second duty duty2 to prevent saturation of the transformer T1.

<Application Examples>

The switching power supply device 1 or the switching power supply device 2 described above can be incorporated in any devices and equipment. Specifically, the switching power supply device 1 or the switching power supply device 2 described above can be incorporated in, for example, industrial equipment and consumer equipment.

Figure 8:
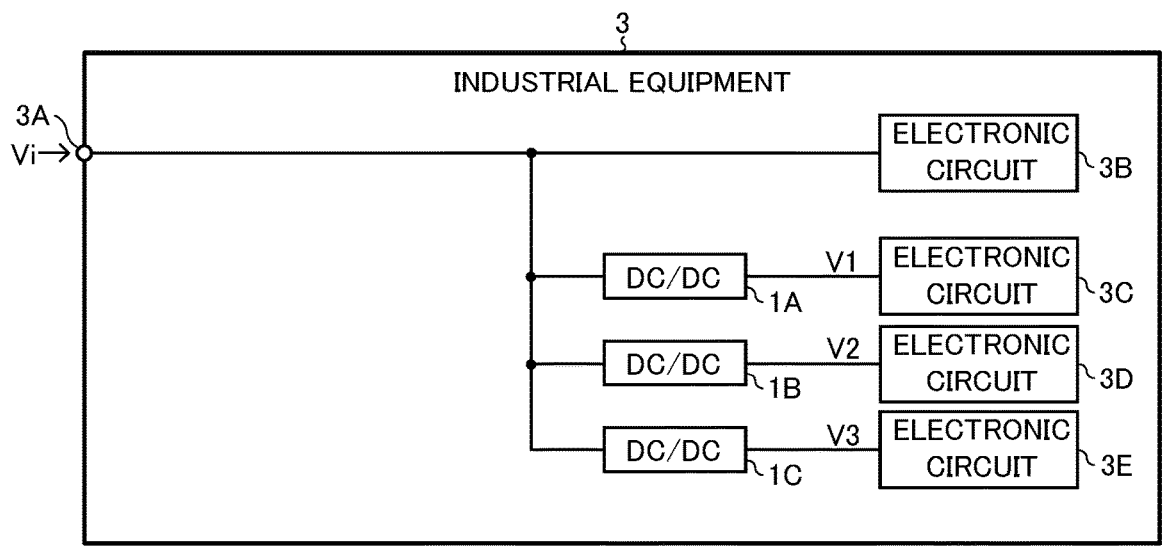
FIG. 8 is a diagram showing a schematic configuration of industrial equipment.

The switching power supply device 1 is incorporated in, for example, industrial equipment 3 as shown in FIG. 8. Then, industrial equipment 3 includes the switching power supply device 1. The switching power supply device 1 is used as each of DC/DC converters 1A to 1C, which will be described later.

The number of electronic circuits and the use of DC/DC converters in the configuration shown in FIG. 8 are merely an example. For example, unlike the configuration shown in FIG. 8, the electronic circuit 3B may be eliminated such that the same numbers of electronic circuits and DC/DC converters are provided. The industrial equipment 3 shown in FIG. 8 includes an input terminal 3A, DC/DC converters 1A to 1C, and electronic circuits 3B to 3E. The input terminal 3A is fed with an input voltage Vi which is a direct-current voltage. The input voltage Vi is fed to the electronic circuit 3B and to the DC/DC converters 1A to 1C. The electronic circuit 3B uses the input voltage Vi as a supply voltage. The DC/DC converter 1A converts the input voltage Vi into a direct-current voltage V1 with a different value from the input voltage Vi and feeds the direct-current voltage V1 to the electronic circuit 3C. The electronic circuit 3C uses the direct-current voltage V1 as a supply voltage. The DC/DC converter 1B converts the input voltage Vi into a direct-current voltage V2 with a different value from the input voltage Vi and feeds the direct-current voltage V2 to the electronic circuit 3D. The electronic circuit 3D uses the direct-current voltage V2 as a supply voltage. The DC/DC converter 1C converts the input voltage Vi into a direct-current voltage V3 with a different value from the input voltage Vi and feeds the direct-current voltage V3 to the electronic circuit 3E. The electronic circuit 3E uses the direct-current voltage V3 as a supply voltage. The industrial equipment 3 shown in FIG. 8 is a wireless base station for a mobile telephone network and incorporates, as the electronic circuits 3B to 3E, a circuit for an antenna, a conversion circuit that converts a high frequency signal into an intermediate frequency signal or a baseband signal, an FPGA (field-programmable gate array), and the like.

Note that, examples of industrial equipment other than a wireless base station for a mobile telephone network include medical equipment, robots provided in production facilities, and the like.

<Notes>

The present invention can be implemented in any manners other than as in the above-described embodiments with any modifications made without departure from the spirit of the present invention. It should be understood that the above-described embodiments are in every aspect illustrative and not restrictive. The technical scope of the present disclosure is defined not by the description of the embodiments given above but by the appended claims, and encompasses any modifications made within a scope equivalent in significance to those claims.

According to one aspect of what is disclosed herein, a switching power supply device (1, 2) includes a switching element (TR1) and a controller (CNT1, CNT2) configured to turn on and off the switching element. The controller includes a current source circuit (IS1) configured to output a predetermined current, a voltage source circuit (VS1) configured to output a predetermined voltage, a PWM signal generation circuit (PM1, DPM1) configured to output a PWM signal, a capacitor (CT1) of which the first terminal is connected to the current source circuit and of which the second terminal is connected to the PWM signal generation circuit, a one-way conduction element (U1) that is provided between the first terminal of the capacitor and the voltage source circuit and that is configured to pass only a current flowing from the capacitor toward the voltage source circuit, and a comparison circuit (CP1) configured to compare the voltage appearing at the first terminal of the capacitor with a voltage based on the output voltage of the switching power supply device and to control the switching device based on the result of the comparison. (A first configuration).

With the switching power supply device of the first configuration described above, both when the switching element is driven with the maximum on duty and when the switching element is not driven with the maximum on duty, the switching element can be controlled directly with the output signal of the comparison circuit. It is thus possible to reduce the number of components of the switching power supply device and to implement maximum on duty control at low cost.

In the switching power supply device of the first configuration described above, the one-way conduction element may be a diode of which the anode is connected to the first terminal of the capacitor and of which the cathode is connected to the voltage source circuit. (A second configuration.)

With the switching power supply device of the second configuration described above, the one-way conduction element can be implemented without any special control.

In the switching power supply device of the first configuration described above, the one-way conduction element may be a synchronous rectification element that turns on and off according to the PWM signal. (A third configuration.)

With the switching power supply device of the third configuration described above, it is possible to reduce the on resistance of the one-way conduction element and thus to enhance efficiency.

In the switching power supply device of any one of the first to third configurations described above, the supply voltage for the controller may be the predetermined voltage. (A fourth configuration.)

With the switching power supply device of the fourth configuration described above, it is easy to make the sum value resulting from adding up the predetermined voltage and the forward voltage across the one-way conduction element higher than the maximum value of the voltage based on the output voltage of the switching power supply device compared by the comparison circuit with the voltage appearing at the first terminal of the capacitor.

In the switching power supply device of any one of the first to fourth configurations described above, the controller may further include a digital processor (DP1) configured to set the period and the pulse width of the PWM signal based on information on the input voltage to the switching power supply device and information on the target output voltage of the switching power supply device. (A fifth configuration.)

With the switching power supply device of the fifth configuration described above, the PWM signal is generated by digital processing and is more accurate, so the maximum on duty control too is more accurate.

In the switching power supply device of the fifth configuration described above, the PWM signal generation circuit may include a clock generation circuit (11) configured to output a clock, a counter (12) configured to update a count value based on the clock, a first determination circuit (13) configured to check the relationship between the count value and a first set value for setting the period of the PWM signal fed from the digital processor, a second determination circuit (14) configured to check the relationship between the count value and a second set value for setting the pulse width of the PWM signal fed from the digital processor, and an output circuit (15) configured to generate the PWM signal based on the result of the check by the first determination circuit and the result of the check by the second determination circuit. The counter may reset the count value based on the result of the check by the first determination circuit. (A sixth configuration.)

With the switching power supply device of the sixth configuration described above, there is no need to provide a plurality of counters in the PWM signal generation circuit, and this helps reduce the cost and the size of the digital PWM signal generation circuit.

In the switching power supply device of any one of the first to sixth configurations described above, the sum value resulting from adding up the predetermined voltage and the forward voltage across the one-way conduction element may be higher than the maximum value of the voltage based on the output voltage of the switching power supply device compared by the comparison circuit with the voltage appearing at the first terminal of the capacitor. (A seventh configuration.)

With the switching power supply device of the seventh configuration described above, it is possible to reliably secure a period during which the switching element is off.

As described above, according to another aspect of what is disclosed herein, a switching control device (CNT1, CNT2) is configured to turn on and off a switching element provided in a switching power supply device, and includes a current source circuit (IS1) configured to output a predetermined current, a voltage source circuit (VS1) configured to output a predetermined voltage, a PWM signal generation circuit (PM1, DPM1) configured to output a PWM signal, a capacitor (CT1) of which the first terminal is connected to the current source circuit and of which the second terminal is connected to the PWM signal generation circuit, a one-way conduction element (U1) that is provided between the first terminal of the capacitor and the voltage source circuit and that is configured to pass only a current flowing from the capacitor toward the voltage source circuit, and a comparison circuit (CP1) configured to compare the voltage appearing at the first terminal of the capacitor with a voltage based on the output voltage of the switching power supply device and to control the switching device based on the result of the comparison. (An eighth configuration.)

With the switching control device of the eighth configuration described above, it is possible to implement maximum on duty control of a switching power supply device at low cost.

According to yet another aspect of what is disclosed herein, industrial equipment (3) includes the switching power supply device according to any one of the first to seventh configurations described above or the switching control device according to the eighth configuration described above. (A ninth configuration.)

With the industrial equipment of the ninth configuration described above, it is possible to implement maximum on duty control of a switching power supply device at low cost.

What is claimed is:

1. A switching power supply device comprising:
   a switching element; and
   a controller configured to turn on and off the switching element,
   wherein
   the controller includes:
   a current source circuit configured to output a predetermined current;
   a voltage source circuit configured to output a predetermined voltage;
   a PWM signal generation circuit configured to output a PWM signal;
   a capacitor of which a first terminal is connected to the current source circuit and of which a second terminal is connected to the PWM signal generation circuit;
   a one-way conduction element that is provided between the first terminal of the capacitor and the voltage source circuit and that is configured to pass only a current flowing from the capacitor toward the voltage source circuit; and
   a comparison circuit configured to compare a voltage appearing at the first terminal of the capacitor with a voltage based on an output voltage of the switching power supply device and to control the switching device based on a result of the comparison.

2. The switching power supply device according to claim 1, wherein
   the one-way conduction element is a diode of which an anode is connected to the first terminal of the capacitor and of which a cathode is connected to the voltage source circuit.

3. The switching power supply device according to claim 1, wherein
   the one-way conduction element is a synchronous rectification element that turns on and off according to the PWM signal.

4. The switching power supply device according to claim 1, wherein a supply voltage for the controller is the predetermined voltage.

5. The switching power supply device according to claim 1, wherein
the controller further includes a digital processor configured to set a period and a pulse width of the PWM signal based on information on an input voltage to the switching power supply device and information on a target output voltage of the switching power supply device.

6. The switching power supply device according to claim 5, wherein
the PWM signal generation circuit includes:
 a clock generation circuit configured to output a clock;
 a counter configured to update a count value based on the clock;
 a first determination circuit configured to check a relationship between the count value and a first set value for setting the period of the PWM signal fed from the digital processor;
 a second determination circuit configured to check a relationship between the count value and a second set value for setting the pulse width of the PWM signal fed from the digital processor; and
 an output circuit configured to generate the PWM signal based on a result of the check by the first determination circuit and a result of the check by the second determination circuit, and
the counter resets the count value based on the result of the check by the first determination circuit.

7. The switching power supply device according to claim 1, wherein
a sum value resulting from adding up the predetermined voltage and a forward voltage across the one-way conduction element is higher than a maximum value of the voltage based on the output voltage of the switching power supply device compared by the comparison circuit with the voltage appearing at the first terminal of the capacitor.

8. Industrial equipment comprising:
the switching power supply device according to claim 1.

9. A switching control device configured to turn on and off a switching element provided in a switching power supply device, comprising:
 a current source circuit configured to output a predetermined current;
 a voltage source circuit configured to output a predetermined voltage;
 a PWM signal generation circuit configured to output a PWM signal;
 a capacitor of which a first terminal is connected to the current source circuit and of which a second terminal is connected to the PWM signal generation circuit;
 a one-way conduction element that is provided between the first terminal of the capacitor and the voltage source circuit and that is configured to pass only a current flowing from the capacitor toward the voltage source circuit; and
 a comparison circuit configured to compare a voltage appearing at the first terminal of the capacitor with a voltage based on an output voltage of the switching power supply device and to control the switching device based on a result of the comparison.

10. Industrial equipment comprising:
the switching control device according to claim 9.

* * * * *